United States Patent
Huang et al.

(10) Patent No.: US 8,245,810 B2
(45) Date of Patent: Aug. 21, 2012

(54) BUGGY ENGINE ANCHORAGE STRUCTURE

(75) Inventors: Huei-Huay Huang, Tainan Hsien (TW); Benson Huang, Tainan Hsien (TW); Weily Chen, Tainan Hsien (TW); Paul Alan Krahn, Roseau, MN (US)

(73) Assignees: Aeon Motor Co., Ltd., Tainan Hsien (TW); Polaris Industries, Inc., Medina, MN (US)

( * ) Notice: Subject to any disclaimer, the term of this patent is extended or adjusted under 35 U.S.C. 154(b) by 272 days.

(21) Appl. No.: 12/382,643

(22) Filed: Mar. 20, 2009

(65) Prior Publication Data
US 2009/0178873 A1    Jul. 16, 2009

(51) Int. Cl.
*B60K 5/04* (2006.01)
(52) U.S. Cl. .................................. 180/291; 180/297
(58) Field of Classification Search .................. 180/291, 180/297, 312
See application file for complete search history.

(56) References Cited

U.S. PATENT DOCUMENTS

| 3,108,481 | A | * | 10/1963 | Westmont | 474/5 |
| 4,343,375 | A | * | 8/1982 | Manning | 180/353 |
| 5,103,690 | A | * | 4/1992 | Macpherson et al. | 74/665 GB |
| 6,591,934 | B2 | * | 7/2003 | Tsutsumikoshi | 180/291 |
| 7,690,472 | B2 | * | 4/2010 | Kato et al. | 180/291 |
| 7,735,593 | B2 | * | 6/2010 | Smith et al. | 180/233 |
| 2008/0108441 | A1 | * | 5/2008 | Lee et al. | 464/46 |

* cited by examiner

*Primary Examiner* — John Walters
(74) *Attorney, Agent, or Firm* — Bacon & Thomas, PLLC

(57) ABSTRACT

The invention provides a buggy engine anchorage structure, which is characterized primarily by the fixing of the engine on a vehicle frame in a horizontal manner, where the output end of the engine is perpendicular to the rear wheel axle, and the output end of the engine and the rear wheel axle are perpendicular to each other to carry out a power linkage through a power output conversion structure by the output end of the engine, which enables the power at the output end of the engine to be transmitted through the power output conversion structure to the rear wheel axle. Accordingly, the engine fixed on the frame horizontally no longer squeezes the space of the vehicle operator and the passengers. Additionally, the engine and the frame can be then integrated into a single piece, which substantially avoids the vibrations due to the engine as the vehicle is moving.

3 Claims, 5 Drawing Sheets

BUGGY ENGINE ANCHORAGE STRUCTURE

BACKGROUND OF THE INVENTION

1. Field of the Invention

This invention generally relates to a buggy engine anchorage structure and more specifically to one that is free of the squeeze of the space of vehicle operator and no vibration of the frame by the engine, where the buggy is able to offer the vehicle operator a feeling of comfort as a result of no vibration at all.

2. Description of the Prior Art

An engine is the power generating source of mobile vehicles. An inappropriate location for the anchorage of the engine would bring about vibrations and torque as the engine runs, which will tremendously affect the smoothness of the vehicle, and further discomfort the vehicle operator. A prior art buggy is shown in FIGS. 1 & 2, where a rear suspension 11 is joined to the backend of the frame 10 of the buggy 1, which further connects to a rear wheel axle 14. The engine 12, sitting on the backend of the frame 10 and the rear suspension 11, is provided with an output end 13 parallel to the rear wheel axle 14. A chain 16 is used to link the gear 130 of the output end 13 of the engine 12 with the gear 140 of the rear wheel axle 14 (shown in FIG. 3), which enables the output end 13 of the engine 12 to drive the rear wheel axle 14 for carrying out rotation. The two ends of the rear wheel axle 14 each is joined with a wheel 15. Since the output end 13 of the engine 12 is to drive the rear wheel axle 14 for the prior art buggies, the output end 13 of the engine 12 has to be parallel to the rear wheel axle 14. And further to meet that requirement, the engine has to be configured in a upright orientation on the frame. However, the upright anchorage of the engine 12 on the frame 10 will, on the other hand, squeeze the space of the driver and the passengers. To improve this drawback for having more room left for the driver and the passengers, the prior art way of settling the engine 12 is to move the engine backward to have the frontend of the upright placed engine 12 fixed at the backend of the frame 10, and to have the backend of the engine 12 sat on the rear suspension 11. This approach of fixing the engine 12 is to place the engine 12 portion on the rear suspension 11, which means loading the weight of the engine 12 on the rear suspension 11, and this will result in vibrations of the vehicle. And the vibrations of the vehicle will for sure discomfort the drive and the passengers.

SUMMARY OF THE INVENTION

In the light of the aforesaid drawbacks, this inventor conceived deeply the idea for the design of the invention, and eventually the longtime endeavors gave birth to this invention.

The objective of the present invention is to provide a buggy engine anchorage structure, which is plain in the architecture and free of occupying the space of the vehicle operator, and is able to offer the vehicle operator and the passengers a feeling of comfort as a result of no vibration.

To achieve the aforesaid objects, the present invention is characterized primarily by: having the engine to be fixed on the vehicle frame in a horizontal orientation, where the output end of the engine is perpendicular to the rear wheel axle, and the output end of the engine and the rear wheel axle which are perpendicular to each other can be carrying out power linkage by means of a power output conversion structure located at the output end of the engine. This means the power of the output end of the engine is transmitted through the power output conversion structure to the rear wheel axle. And as such, the engine is configured to fix on the frame horizontally without squeezing the space of the driver and the passengers, and it is further integrated with the frame to avoid vibrations due to the engine when the vehicle is moving.

DETAILED DESCRIPTION OF THE INVENTION

To achieve the foregoing objects of the present invention, the techniques adopted and the achievable function are detailed described with reference to the following preferred exemplified embodiment and the accompanying drawings for a thorough comprehension.

Figure 1:
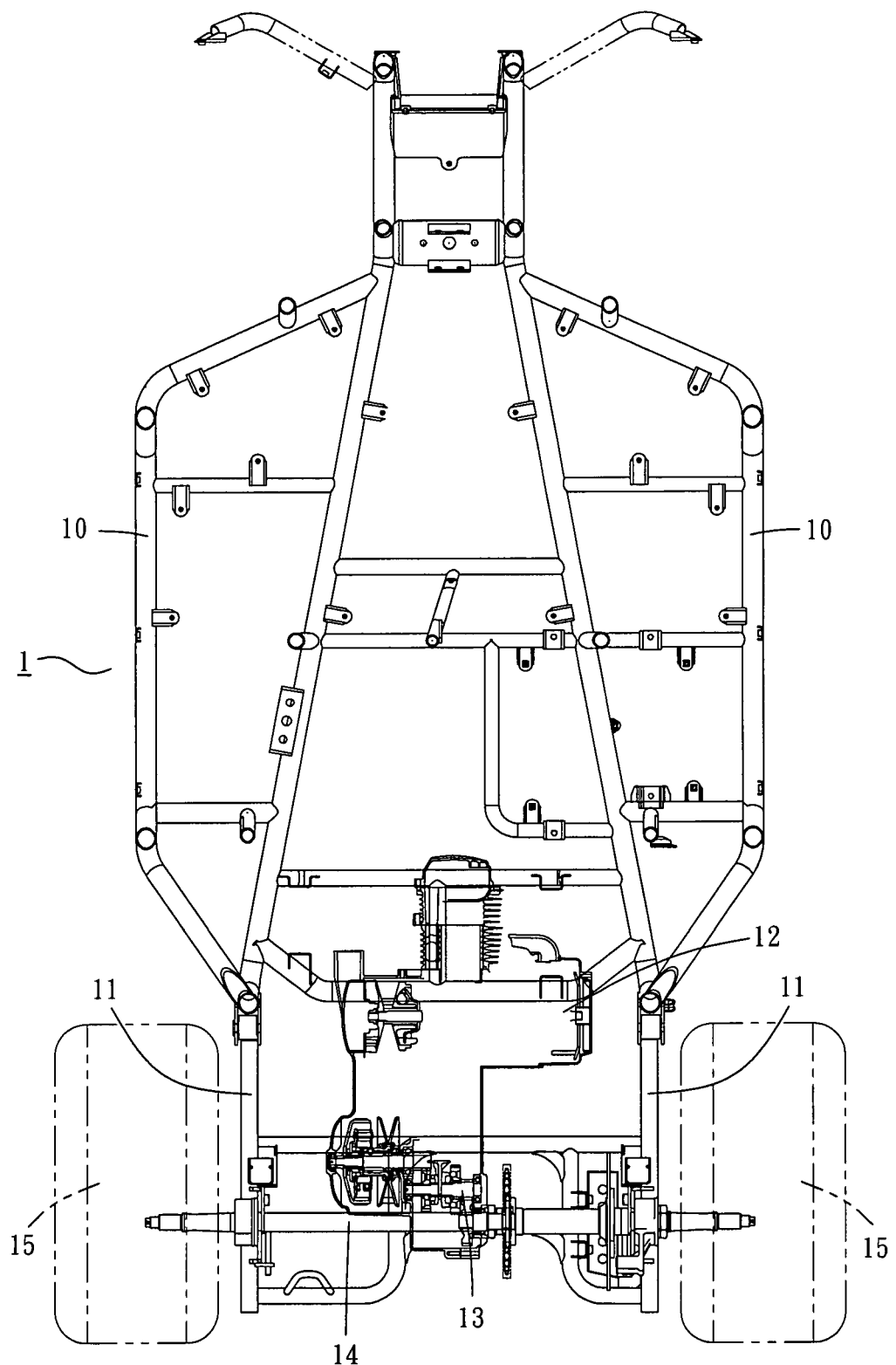
FIG. 1 is a schematic top view of the installation of a prior art engine.
Figure 5:
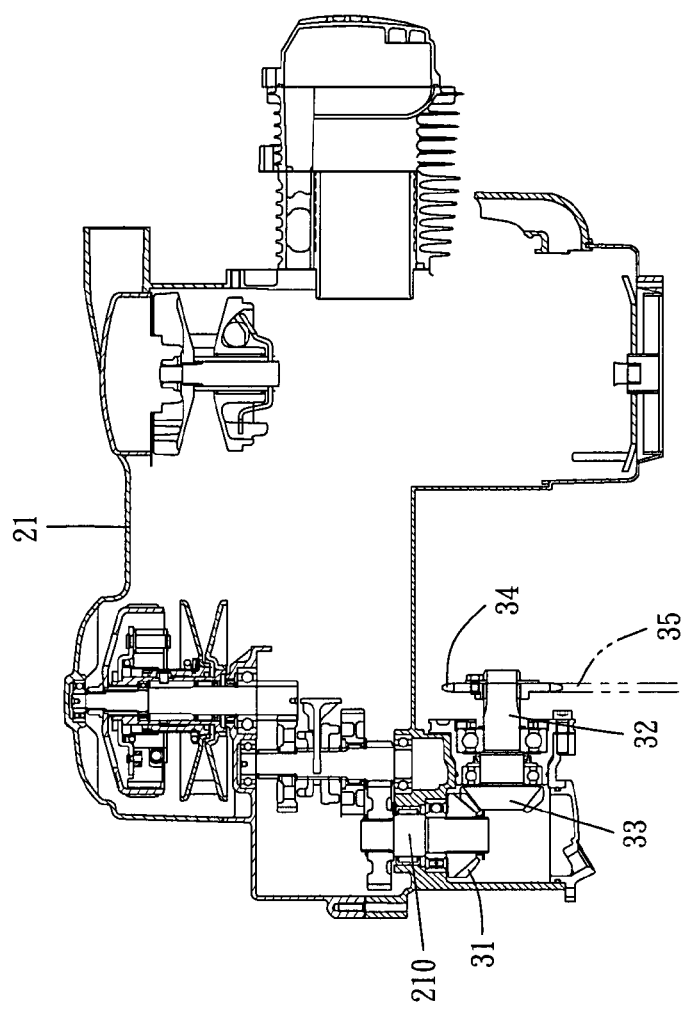
FIG. 5 is a partial enlargement view of the preferred embodiment of the present invention.
Figure 2:
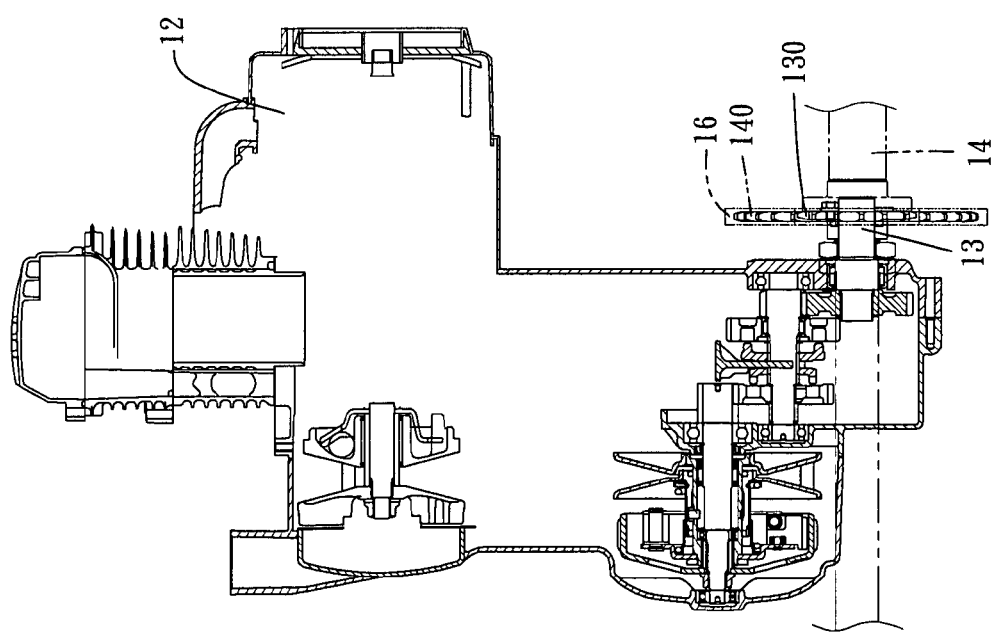
FIG. 2 is a partial enlargement view of a prior art engine.
Figure 3:
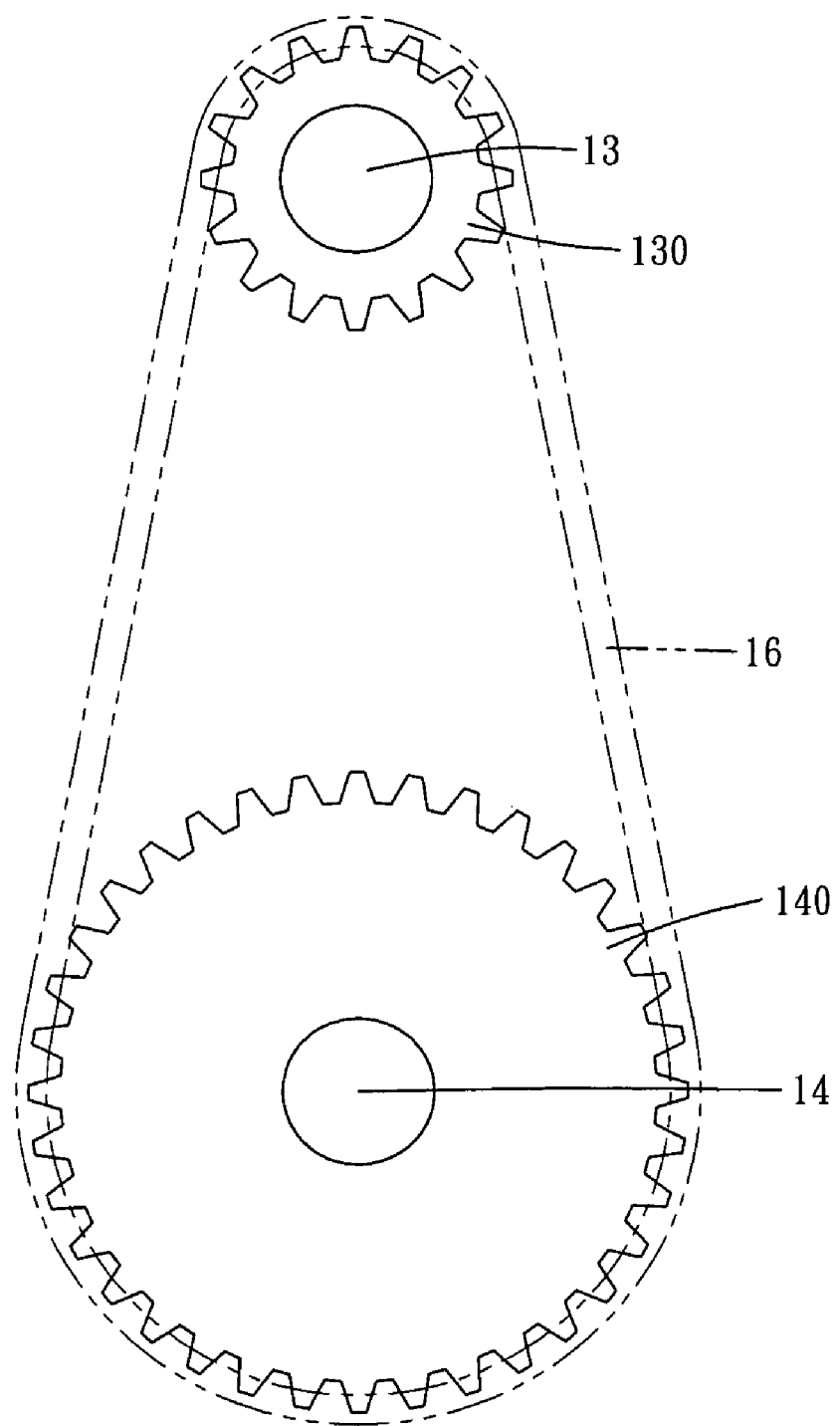
FIG. 3 is a reference view of a prior art engine driving the rear wheel axle.
Figure 4:
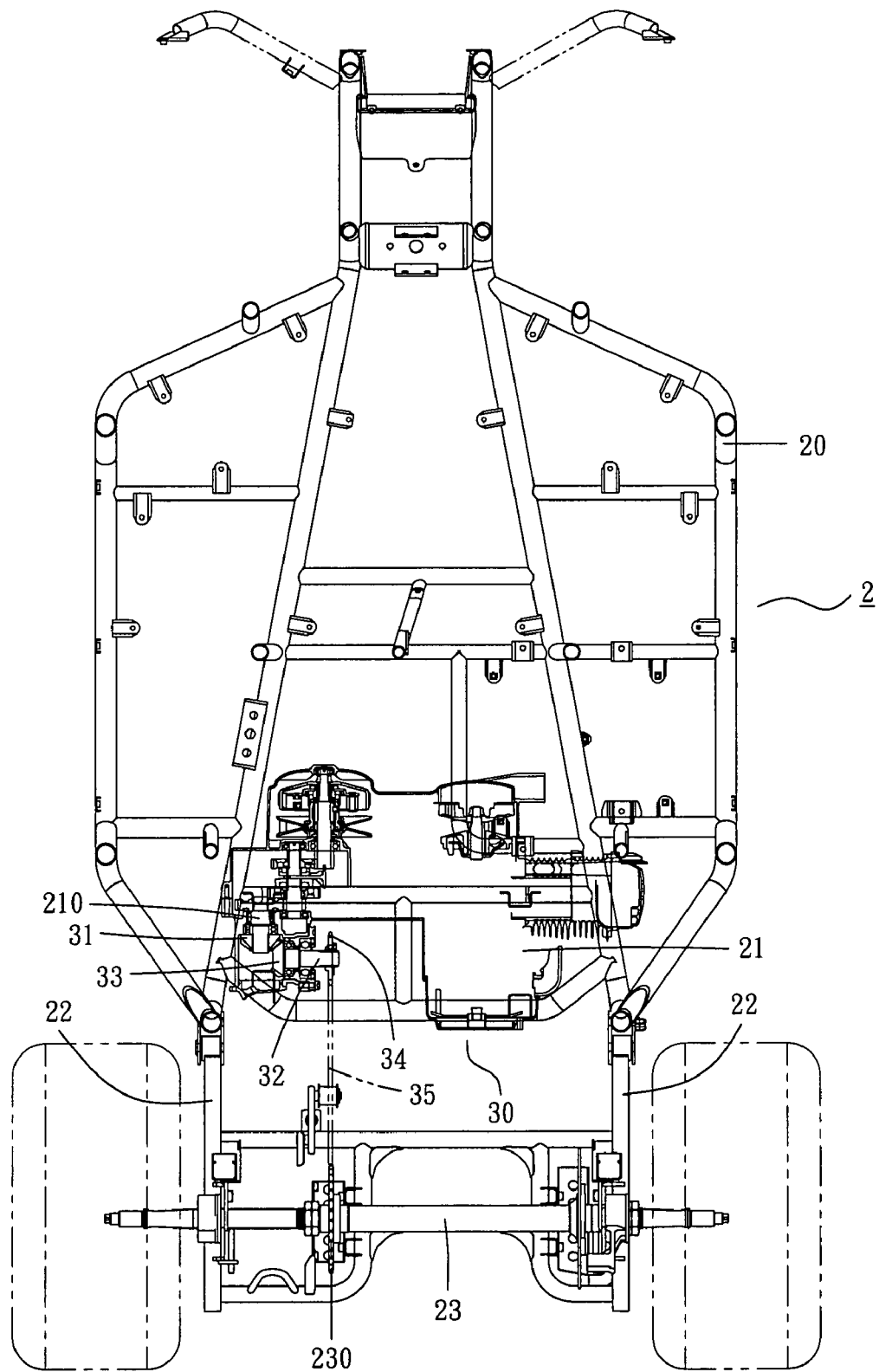
FIG. 4 is a schematic top view of the installation of the engine of the preferred embodiment of the present invention.

Referring to FIGS. 4 & 5, the buggy 2 of the present invention comprises a frame 20, an engine 21 configured to fix on the frame, a rear suspension 22 connected to the backend of the frame and a rear wheel axle 23 joined with the rear suspension 22.

The improvement of the present invention lies in: the engine 21 is fixed on the frame 20 in a horizontal manner, where the output end 210 of the engine 21 is perpendicular to the rear wheel axle 23, and the two (the output end 210 of the engine 21 and the rear wheel axle 23) which are perpendicular to each other can be carrying out power linkage by means of a power output conversion structure 30 located at the output end of the engine. This means the power at the output end 210 of the engine 21 is transmitted through the power output conversion structure 30 to the rear wheel axle 23. And as such, the engine 21 is then horizontally fixed on the vehicle frame 20, instead of sitting on the rear suspension 22 as the prior art, and also free of squeezing the space of the driver and the passengers.

The power output conversion structure 30 fixes a first bevel gear 31 at the output end 210 of the engine 21. A steering axle 32, in pinned connection to the frame 20, is parallel to the rear wheel axle 23. A second bevel gear 33 corresponds to the first bevel gear 31, and the first and second bevel gears 31, 33 are geared to each other, which enables the output end 210 of the engine 21 to drive the steering axle 32 to rotate by means of the first and second bevel gears 31, 33. A gear 34 is fixed at the other end of the steering axle 32, where the gear 34 is linked to a gear 230 at the rear wheel axle 23 through a chain 35 (shown in FIG. 4).

Referring to FIGS. 4 & 5, the use of this invention covers the following motion steps: the vehicle operator ignites the engine 21→ the output end 210 of the engine 21→ the power output conversion structure 30 (the first bevel gear 31 → the second bevel gear 33→ the steering axle 32→ the gear 34→ the chain 35→ the gear 230)→ the rear wheel axle 23.

Figure 6:
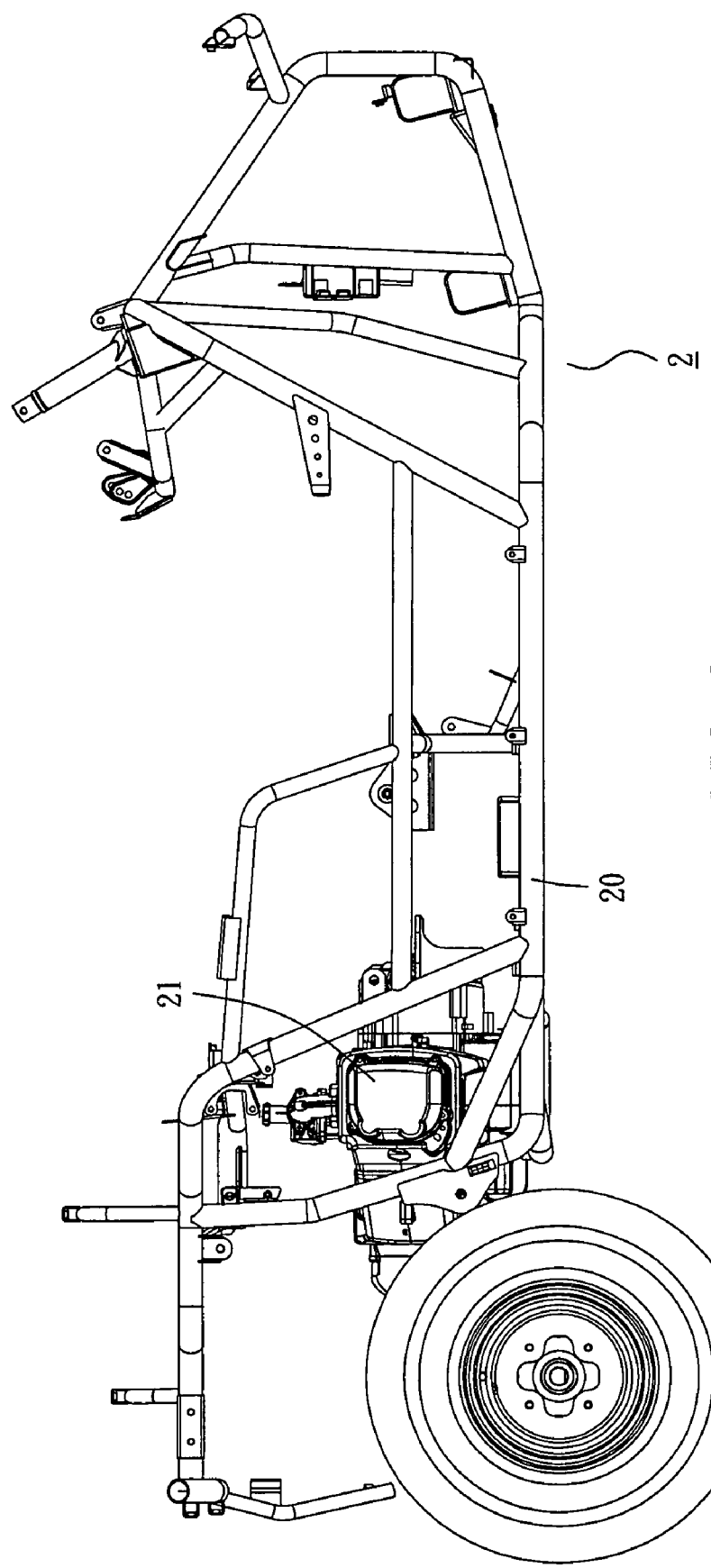
FIG. 6 is a schematic view of the installation of the engine at the right side of the vehicle of the preferred embodiment of the present invention.

Referring to FIG. 6, the engine 21 of this invention is configured to fix on the frame 20 in a horizontal manner; therefore, it won't squeeze the space of the driver and the passengers in the front part of the vehicle. Moreover, the engine 21 horizontally fixed on the frame 20 as shown in FIGS. 4 & 6, can be entirely fixed on the frame 20, which is to integrate the engine 21 and the frame 20 into a single piece, available to wipe out the vibrations of the vehicle due to the engine 21. And this is more useful and creative than the prior art.

To sum up, the present invention is not only creative and novel, but useful and practical, which is fully in compliance with the requirements of invention patentability, thereby filing the present application herein subject to the patent law.

What is claimed is:

1. A buggy engine anchorage structure, comprising a frame, an engine fixed on the frame, a rear suspension connected to a backend of the frame, a rear wheel axle joined with the rear suspension and a wheel at each of two sides of the rear wheel axle, said buggy engine anchorage structure comprising:

said engine fixed on the frame in a horizontal manner, wherein said engine comprises an output end perpendicular to the rear wheel axle, and a power output conversion structure comprising a chain drive, said power output conversion structure coupled to the output end of the engine, wherein the output end of the engine and the rear wheel axle are configured to carry out a power linkage of the output end through the power output conversion structure located at the output end of the engine, and wherein the power output conversion structure is configured so that the chain drive is arranged to transmit the power at the output end of the engine to the rear wheel axle through a chain connecting a chain sprocket gear at the output end of the engine to a chain sprocket gear at the rear wheel axle.

2. The buggy engine anchorage structure as in claim 1, wherein the power output conversion structure has a first bevel gear fixed at the output end of the engine; having a steering axle connected with the frame, which is parallel to the rear wheel axle, and a second bevel gear corresponding to the first bevel gear, where the first and second bevel gears are geared to each other, which enables the output end of the engine to drive the steering axle to rotate by means of the first and second bevel gears.

3. The buggy engine anchorage structure as in claim 1, wherein the engine is fixed near the backend of the frame.

* * * * *